United States Patent Office 3,446,782
Patented May 27, 1969

3,446,782
METHOD OF MANUFACTURE OF POWDERY SYNTHETIC LINEAR POLYAMIDES
Kaoru Okazaki, Masaru Nakasatomi, and Minoru Maruyama, Nagoya, Japan, assignors to Toyo Rayon Kabushiki Kaisha, Tokyo, Japan, a corporation of Japan
No Drawing. Filed Apr. 11, 1966, Ser. No. 541,510
Claims priority, application Japan, Apr. 14, 1965, 40/21,625; July 28, 1965, 40/45,323
Int. Cl. C08g 53/02, 53/03
U.S. Cl. 260—78                    8 Claims

ABSTRACT OF THE DISCLOSURE

A method for manufacturing a powdery synthetic linear polyamide which comprises (1) forming a mixture of an aliphatic polycarbonamide and an aqueous solution of an unsubstituted lactam; (2) heating such mixture to a temperature lower than the melting point of the polycarbonamide and higher than the temperature at which the polycarbonamide is softened in the presence of the aqueous solution of lactam so as to form an emulsion—or solution—like dispersion system; and (3) thereafter cooling the system to recover the powdery polycarbonamide.

Such process allows the production of the powdery synthetic linear polycarbonamide without such problems as degradation, coloration, or gelation.

---

This invention relates to a method of the manufacture of powdery synthetic linear polyamides, and more specifically to a method of manufacturing powder of pure and non-coloured synthetic linear polyamides which has a particle size in a predetermined range most suitable for shaping and coating, from synthetic linear polyamide.

Many methods have been proposed in the past to obtain linear polyamide in the form of powder useful for shaping and coating. For instance, it is known to produce powdery polyamide by adding a synthetic linear polyamide to an alcohol such as methyl alcohol, ethylene glycol, and triethylene glycol, heating this system under pressure in non-oxidizing atmosphere to make a homogeneous solution, and thereafter cooling this system (U.S. Patents Nos. 2,592,616 and 2,639,278).

U.S. Patent Number 3,130,181 discloses a method of preparing a finely divided linear polyamide by adding a synthetic linear polyamide to an aqueous solution of aliphatic ketone or cycloaliphatic ketone, heating this system at high temperatures to make an emulsion, and thereafter cooling this system.

In these known methods of preparing polyamide powder, however, a medium used has a relatively high activity at high temperature conditions, and so degradation and chemical change of a polyamide take place at the time of heat treatment, thereby inevitably causing the lowering of the viscosity and the colouration of the polymer. Furthermore, the used solvent remains adhered to the powder of polyamide, and it is difficult to recover the solvent and also to take out a pure polyamide powder.

With these known methods, it is generally difficult to obtain, with reproducibility, powder of polyamide whose particle size is defined with a predetermined range.

Accordingly, an object of this invention is to manufacture powder of pure synthetic linear polyamide whose particle size is confined within a predetermined range most suitable for shaping and coating, without causing any disadvantage such as degradation and colouration of the polyamide polymer, by using a relatively inexpensive solvent.

Other objects and advantages of this invention will become apparent from the description which follows.

The above-mentioned object of this invention can be achieved in accordance with this invention by a method of manufacturing powdery synthetic linear polyamide which is characterised by adding a linear synthetic polyamide to an aqueous solution of lactam containing no aromatic ring, heating the mixture while stirring under pressure at a temperature lower than a temperature at which the said polyamide melts and above a temperature at which the said polyamide begins to become softened to thereby form an emulsion- or solution-like dispersion system, and cooling this dispersion system to thereby recover powder of the said polyamide.

By the synthetic linear polyamide used in this invention is meant a polyamide derived by polymerisation from amino acid, lactam, or diamines and dicarboxylic acids, or a copolyamide prepared from the said monomers. Examples of such polyamide are polycapramide (nylon-6), polyhexamethylene, adipamide (nylon-6,6), polyhexamethylene sebacamide (nylon-6,10), polyheptanamide (nylon-7), polynonanamide (nylon-9), polyundecanamide (nylon-11), polydodecanamide (nylon-12), polyamide prepared from para-xylylene diamine and dodecane dicarboxylic acid (nylon PXD-12), and copolymers of these. These linear polyamides may be of a molten mass right after polymerisation, a cooled and solidified mass or pellet. Of course, scraps of shaped articles of these nylons and rejects from the shaping step can be used.

The essential feature of this invention resides in the use of an aqueous solution of lactam without any aromatic ring as a solvent for the said synthetic linear polyamide. In other words, this invention is bsed on the discovery that when such aqueous lactam solution is used as a dispersion medium, degradation and colouration of a synthetic linear polyamide material do not occur, and that by adjusting a ratio of water to lactam in the aqueous solution, the particle size of the obtained powder can be controlled and it is thus possible to obtain linear polyamide powder of a desired particle size.

The lactam used in accordance with this invention is a unsubsituted water-soluble aliphatic lactam which contains no aromatic ring. Examples of such lactam are $\gamma$-butanolactam, $\delta$-pentanolactam, $\zeta$-heptanolactam, $\epsilon$-caprolactam, $\eta$-octanolactam, $\theta$-nonanolactam, $\omega$-decanolactam, $\omega$-undecanolactam, $\omega$-dodecanolactam, chlorine-substituted products of these lactams, and vinyl-substituted products of these lactams.

The concentration of the aqueous solution of lactam used can be varied over a wide range depending upon the type of the used lactam and the type of the starting linear polyamide. Generally speaking, the suitable concentration is in the range of 10 to 95% by weight. With respect to nylon 11 and nylon 12, the concentration of 60 to 95% by weight is particularly preferable. For nylon 6,10, preferable is the concentration in the range of 40 to 95% by weight. The concentration in the range of 20 to 60% by weight is particularly desirable for all other nylons mentioned here. When the concentration of the lactam aqueous solution falls below 20% weight, particularly 10% by weight, the polyamide slurry becomes increasingly irregular and the obtained powder comes to contains coarse particles. On the other hand, when it reaches above 60% by weight, particularly 95% by weight, the polyamide particles become very finely divided and such operations as filtration, water-washing and drying get difficult. For these reasons, the concentration of the lactam aqueous solution outside the above-specified range is not desirable.

Within the above range of concentration, there is a general tendency that with the increase of the lactam concentration in the aqueous lactam solution, the particle diameter of the obtained powdery polyamide decreases.

An amount of a linear polyamide to be added to an aqueous solution of lactam differs depending upon the type of the polyamide, but generally it is in the range of 1 to 30% by weight based on the solution, and preferably 5 to 15% by weight. If the concentration of polyamide is less than 5% by weight, particularly less than 1% by weight, the produced polyamide powder is extremely finely divided, and subsequent recovering and purification operations such as filtration and water-washing become difficult. If the concentration of polyamide in the aqueous lactam solution exceeds 30% by weight, the particles of the obtained polyamide tend to get coarse and there is an increasing irregularity in the particles.

In accordance with this invention, a linear polyamide is added to an aqueous solution of lactam and the resulting mixture is heated at a temperature lower than a temperature at which the linear polyamide melts and above a temperature at which the linear polyamide begins to become softened. The terminology "a temperature at which the linear polyamide begins to become softened," used in the specification and claim, does not mean the "softening point" as used in the polymer field, but a temperature at which a mass of the said polyamide is softened in the presence of an aqueous solution of lactam and begins to flow. This temperature differs depending upon the type and concentration of the lactam in the aqueous solution of lactam. The following Table I shows the temperatures in question of various polyamides with respect to a 20% aqueous solution of ε-caprolactam.

TABLE I

| Linear polyamide | Melting point, (° C.) | Temperature at which the polyamide begins to become softened in 20% aqueous solution of ε-caprolactam (° C.) |
|---|---|---|
| Nylon-6 | 215 | 150–160 |
| Nylon-11 | 187 | 160–170 |
| Nylon-12 | 175 | 160–170 |
| Nylon-6,6 | 250 | 170–180 |
| Nylon-6,10 | 215 | 180–190 |
| Nylon PXD-12 | 263 | 200–205 |
| Copolymerised nylon 6/610 | 170 | 125–135 |

In order to disperse the said linear polyamide into an aqueous solution of lactam, the system consisting of the linear polyamide and the aqueous lactam solution is stirred under pressure, preferably under a vapour pressure at the said heating temperature. It is not always necessary in this case to replace air in the vessel by such an inert gaseous atmosphere as nitrogen and carbon dioxide, but generally it will be preferable to do so. By such procedure, a dispersion system which looks like an emulsion or a solution can be obtained. The use of a temperature 5 to 30° C. higher than a point at which the said linear polyamide begins to become softened for the purpose of heating a mixture of the linear polyamide and the lactam is preferable to make the distribution of the particle diameter of the intended powdery polyamide uniform. Heating the mixture at a temperature above the point at which the polyamide melts is likely to cause colouration of the intended powdery polyamide and the extreme decrease in the particle diameter as to make it troublesome to handle.

Powdery polyamide can be prepared by subsequent cooling of the obtained dispersion system composed of the linear polyamide and the aqueous lactam solution. This powdery polyamide can be recovered by known solid-liquid separating operation such as filtration and centrifugal. If desired, the product is washed or extracted with cold or hot water to thereby remove the solvent or the unreacted monomer or lowly polymerised product contained in the starting linear polyamide.

Thus, in accordance with the method of this invention, it is possible to produce a pure and white synthetic linear polyamide powder whose particle diameter is confined within a predetermined range most suitable for shaping and coating, without attendant degradation of the polyamide polymer, by using the aqueous lactam solution as mentioned above as a dispersing medium for the linear polyamide. The powdery polyamide manufactured in accordance with a preferred embodiment of this invention does not substantially contain the unreacted monomer and the lowly polymerised product present in the starting polyamide.

The method of this invention has many advantages over a method of obtaining a powdery polyamide by adding a synthetic linear polyamide to a molten lactam itself, heating this system to make a homogeneous solution, cooling this solution, and thereafter adding water which is a non-solvent.

Lactams are solid at room temperature, and so it is necessary to employ complicated operations and equipments to handle it as a solvent. When polyamide is caused to crystallise out by adding water, non-solvent, to a solution of polyamide in lactam, it inevitably follows that the concentration of the polyamide in the solution becomes very much lowered and the obtained polyamide particles are extremely finely divided with indication of irregularity in the particle diameter. Furthermore, it is impossible to obtain powder of optional particle size. As water necessary to crystallise out polymer perfectly is added to the gel-like material, additional operations and equipments become necessary to recover anhydrous lactam from an aqueous solution of lactam after the removal of powdery polyamide.

On the other hand, as in the method of this invention, when an aqueous solution of lactam is used as a dispersing medium, the liquor after the removal of polyamide powder can be re-used, which renders the cost of the solvent low. In addition, by adjusting the concentration of the aqueous lactam solution and that of polyamide in this solution, it is possible to adjust the particle diameter of the obtained polyamide powder to the most desirable range.

The invention will now be explained with reference to examples which follow.

Example 1

A 2-litre autoclave was charged with 1500 g. of a 40% aqueous solution of ε-caprolactam and the system was heated to a temperature of 180° C. Then, 150 g. of a molten polycapramide obtained by polymerisation was added thereto. This system was stirred for about 3 minutes at 180° C., and cooled to 80° C. The resultant slurry was suction filtered and the cake was washed three times with about 6 times its weight of hot water to thereby form 130 g. of a pure white powder. The relative viscosity of this powder is 2.45 which is much the same as the viscosity (2.48) of the starting polyamide prior to treatment. The water-soluble component had been removed to 0.05%. The average particle diameter of this powder is 8.7μ.

Example 2

The procedures of Example 1 were repeated except that 150 g. of polyhexamethylene adipamide was used in place of 150 g. of polycaprolactam. There was obtained 148 g. of a white powdery polyhexamethylene adipamide having an average particle diameter of 6.7μ. The relative viscosity of this powder is 2.50 and is much the same as the viscosity (2.52) of the starting polyhexamethylene adipamide prior to treatment.

Example 3

A 2-litre autoclave was charged with 1500 g. of a 35% aqueous solution of γ-butanolactam and 150 g. of ε-caprolactam polymerization product, and by stirring for about 5 minutes at 160° C., the said polymerisation product was dispersed in the aqueous solution, and cooled to room temperature. The obtained polycaproamide slurry was filtered, washed with water, and dried thoroughly under reduced pressure. When the obtained cake was divided by means of a sample mill, 130 g. of pure white polycaproamide powder was obtained. The average particle diameter of this powder is 5.5μ and more than 92% of the whole powder has a particle distribution of less than 20μ, showing a uniform distribution. The water-soluble component contained in this powder is less than 0.18% by weight. The relative viscosity of this powder measured with the use of a 98% sulfuric acid as a solvent at a concentration of 1 g./100 ml. and at 25° C. is 3.38, which is much the same as the viscosity (3.40) of the starting polycaproamide prior to treatment.

Example 4

The apparatus of Example 1 was used. Polydodecanamide (120 g.) was added to 1500 g. of a 80% aqueous solution of γ-butanolactam within the apparatus, and this system was heated to 180° C. while stirring, and cooled. The obtained slurry was treated similarly to Example 1 and 117 g. of a pure white polydodecanamide powder was obtained. This powder has a relative viscosity of 2.44, which is much the same as the viscosity (2.36) of the starting polydodecanamide.

Example 5

The same apparatus as used in Example 1 was charged with 450 g. of η-octanolactam, 1050 g. of water, and 150 g. of polyoctanamide, and the system was maintained at 155° C. for about 5 minutes while stirring, and cooled. The obtained powdery slurry was treated as in Example 1 to form 143 g. of white powder of polyoctanamide. The average particle diameter of this powder is 12.5μ, and more than 90% thereof is a powder having a particle diameter less than 100μ. The relative viscosity of this powder is 2.21 which is much the same as the viscosity (2.28) of the stirring polyamide prior to powderisation.

Example 6

A 2-litre autoclave was charged with 1500 g. of an 80% aqueous solution of ε-caprolactam and heated to 180° C. To the solution was added 150 g. of an untreated molten polyundecanamide, and the system was stirred for about 3 minutes while maintaining the temperature at 180° C. under vapour pressure, followed by cooling to a temperature of 80° C. at a rate of 20° C. per hour. The resulting slurry was suction filtered, washed thrice with about 6 times its weight of hot water, and dried to form 140 g. of powder. This power has a relative viscosity of 2.52, which is much the same as the viscosity (2.55) prior to treatment. The water-soluble component was decreased from 0.95% prior to treatment to 0.18%. The average particle diameter of the obtained powder is 78.7μ, showing uniformity.

Example 7

A 2-litre autoclave was charged with 1500 g. of a 78% aqueous solution of ε-caprolactam, and heated to a temperature of 170° C. To the solution was added 180 g. of an untreated molten polydodecanamide, and the system was stirred for about 3 minutes while maintaining the temperature at 170° C. under vapour pressure, followed by cooling to a temperature of 80° C. at a rate of 20° C. per hour. The resulting slurry was suction filtered, washed thrice with about 6 times its weight of hot water, and dried to form 170 g. of powder. This powder has a relative viscosity of 2.62 which is much the same as the viscosity (2.67) prior to treatment. The water-soluble component was decreased from 0.63% prior to treatment of 0.13%. The average particle diameter of this powder is 158.9μ, showing uniformity.

Example 8

A 2-litre autoclave was charged with 1500 g. of a 40% aqueous solution of ε-caprolactam, and heated to 190° C. To the solution was added 100 g. of an untreated molten polyhexamethylene sebacamide, and the system was stirred for about 5 minutes while maintaining the temperature at 190° C., followed by cooling to a temperature of 80° C. The obtained slurry was suction filtered, washed with about 6 times its weight of hot water, and dried to form powder. This power has a relative viscosity of 2.40 which is much the same as the viscosity (2.43) prior to treatment, and has an average particle diameter of 12μ.

What we claim is:

1. A process of manufacturing a powdery synthetic linear polycarbonamide, which comprises (1) adding a synthetic linear aliphatic polycarbonamide to an aqueous solution of an unsubstituted lactam; (2) heating the resultant mixture with stirring under pressure at a temperature lower than the temperature at which said polycarbonamide melts and higher than the temperature at which a mass of said polycarbonamide is softened in the presence of said aqueous solution of the lactam and begins to flow, to form an emulsion—or solution—like dispersion system; and (3) thereafter cooling the system to recover the powdery polycarbonamide.

2. A process in accordance with claim 1 wherein said lactam is selected from the group consisting of γ-butanolactam, δ-pentanolactam, ε-caprolactam, ʃ-heptanolactam, η-octanolactam, θ-nonanolactam, ω-decanolactam, ω-undecanolactam and ω-dodecanolactam.

3. A process in accordance with claim 1 wherein said aqueous solution of lactam contains 10 to 95% by weight of said lactam.

4. A process in accordance with claim 1 wherein said synthetic linear aliphatic polycarbonamide is selected from the group consisting of polyundecanamide and polydodecamide, and said aqueous solution of lactam contains 60 to 95% by weight of the lactam.

5. A process in accordance with claim wherein said synthetic linear aliphatic polycarbonamide is polyhexamethylene sebacamide, and the said aqueous solution of lactam contains 40 to 95% of the lactam.

6. A process in accordance with claim 1 wherein said synthetic linear aliphatic polycarbonamide is selected from the group consisting of polycapramide and polyhexamethylene adipamide, and the said aqueous solution of lactam contains 5 to 15% by weight of the lactam.

7. A process in accordance with claim 1 wherein said synthetic linear aliphatic polycarbonamide is added in an amount of 1 to 30% by weight based on the aqueous lactam solution.

8. A process in accordance with claim 1 wherein said synthetic linear polycarbonamide is added in an amount 5 to 15% by weight based on the aqueous lactam solution.

References Cited

UNITED STATES PATENTS 3,228,902    1/1966    Beste _____ 260—78

WILLIAM H. SHORT, *Primary Examiner.*

H. D. ANDERSON, *Assistant Examiner.*

U.S. Cl. X.R.

260—29.2, 78